(12) United States Patent
Ono

(10) Patent No.: US 11,935,425 B2
(45) Date of Patent: Mar. 19, 2024

(54) ELECTRONIC DEVICE, PRONUNCIATION LEARNING METHOD, SERVER APPARATUS, PRONUNCIATION LEARNING PROCESSING SYSTEM, AND STORAGE MEDIUM

(71) Applicant: CASIO COMPUTER CO., LTD., Tokyo (JP)

(72) Inventor: Manato Ono, Wako (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 17/008,053

(22) Filed: Aug. 31, 2020

(65) Prior Publication Data

US 2021/0090465 A1 Mar. 25, 2021

(30) Foreign Application Priority Data

Sep. 20, 2019 (JP) ................................. 2019-171266

(51) Int. Cl.
*G09B 19/04* (2006.01)
*G09B 5/06* (2006.01)
*G09B 19/06* (2006.01)

(52) U.S. Cl.
CPC ............. *G09B 19/04* (2013.01); *G09B 5/06* (2013.01); *G09B 19/06* (2013.01)

(58) Field of Classification Search
CPC .......... G09B 5/06; G09B 19/04; G09B 19/06
See application file for complete search history.

(56) References Cited

U.S. PATENT DOCUMENTS

| 6,983,248 B1* | 1/2006 | Tahara ................. G10L 15/187 704/E15.02 |
| 7,266,495 B1* | 9/2007 | Beaufays .............. G10L 15/187 704/E15.02 |
| 2002/0120447 A1* | 8/2002 | Charlesworth ......... G10L 15/06 704/254 |
| 2009/0305203 A1 | 12/2009 | Okumura et al. |

(Continued)

FOREIGN PATENT DOCUMENTS

| JP | 2006-119825 A | 5/2006 |
| JP | 2015-099335 A | 5/2015 |

(Continued)

OTHER PUBLICATIONS

K. Kamimura and K. Takano, "Phoneme Sequence Extraction of Learner's Pronunciation Errors for Foreign Language Learning," 2019 IEEE Pacific Rim Conference on Communications, Computers and Signal Processing (PACRIM), 2019, pp. 1-6, Date of Conference: Aug. 21-23, 2019 (Year: 2019).*

(Continued)

*Primary Examiner* — Jack Yip
(74) *Attorney, Agent, or Firm* — Fitch, Even, Tabin & Flannery LLP

(57) ABSTRACT

Pronunciation learning processing is performed, in which evaluation scores on pronunciation for respective words are acquired from a pronunciation test that uses multiple words, the acquired evaluation scores are summated for each combination of consecutive pronunciation components in the words, and learning information based on the result of summation is output.

7 Claims, 7 Drawing Sheets

(56) References Cited

U.S. PATENT DOCUMENTS

2016/0055763 A1\* 2/2016 Nakamura ............. G09B 19/06
　　　　　　　　　　　　　　　　　　　　　　434/157
2018/0315420 A1\* 11/2018 Ash ....................... G10L 15/193
2021/0043196 A1\* 2/2021 Lee ......................... G10L 15/32

FOREIGN PATENT DOCUMENTS

| JP | 2016-045420 A | 4/2016 |
| WO | 2007037356 A1 | 4/2007 |

OTHER PUBLICATIONS

JPO; Application No. 2019-171266; Notice of Reasons for Refusal dated Jan. 11, 2022.

\* cited by examiner

FIG. 2

12e (Pronunciation attribute management table)

| English word | Subject phonetic symbol | Attribute | Succeeding phonetic symbol | Attribute |
|---|---|---|---|---|
| thank | θ | Fricative | æ | Vowel which does not exist in Japanese |
| thaw | θ | Fricative | ɔː | Vowel which does not exist in Japanese |
| think | θ | Fricative | i | Vowel [i] |
| thought | θ | Fricative | ɔː | Vowel which does not exist in Japanese |
| thread | θ | Fricative | r | Lateral/retroflex |
| throat | θ | Fricative | r | Lateral/retroflex |
| theory | θ | Fricative | ɪː | Others |
| library | l | Flap | ɑ | Vowel which does not exist in Japanese |
| long | l | Flap | ɔː | Vowel which does not exist in Japanese |
| year | j | Approximant | i | Vowel which does not exist in Japanese |
| yes | j | Approximant | e | Vowel [e] |
| normal | n | Nasal | ɔː | Vowel which does not exist in Japanese |
| nerve | n | Nasal | ə | Vowel which does not exist in Japanese |
| power | p | Plosive | ɑ | Vowel which does not exist in Japanese |
| picture | p | Plosive | i | Vowel [i] |
| bright | b | Plosive | r | Lateral/retroflex |
| chain | tʃ | Affricate | e | Vowel [e] |
| chew | tʃ | Affricate | u | Vowel [u] |

12f (bracket grouping thank, thaw, think, thought, thread, throat, theory)

ELECTRONIC DEVICE, PRONUNCIATION LEARNING METHOD, SERVER APPARATUS, PRONUNCIATION LEARNING PROCESSING SYSTEM, AND STORAGE MEDIUM

CROSS-REFERENCE TO RELATED APPLICATION(S)

This application is based upon and claims the benefit of priority from prior Japanese Patent Application No. 2019-171266, filed Sep. 20, 2019, the entire contents of which are incorporated herein by reference.

BACKGROUND OF THE INVENTION

1. Field of the Invention

The present invention relates to an electronic device, a pronunciation learning method, a server apparatus, a pronunciation learning processing system, and a storage medium for implementing word pronunciation learning.

2. Description of the Related Art

Conventional learning devices offered for word pronunciation learning include a pronunciation learning support device furnished with functions for conducting a word pronunciation test for a user, specifying the pronunciation component with which the user struggles from the result of this pronunciation test, and encouraging the user to practice pronunciation for the specified pronunciation component (e.g., Jpn. Pat. Appln. KOKAI Publication No. 2016-045420).

Such a conventional pronunciation learning support device can specify a pronunciation component at which a user is not proficient and proceed with pronunciation practice for the specified pronunciation component according to the result of a word pronunciation test.

SUMMARY

According to an aspect of the invention, an electronic device includes a memory that stores learning information, and at least one processor. The processor is adapted to perform pronunciation learning processing which includes evaluating user's pronunciation of a plurality of words for each combination of consecutive pronunciation components in the words, and outputting the learning information based on a result of the evaluation.

According to an aspect of the invention, a pronunciation learning method is performed by at least one processor of an electronic device which includes a memory storing learning information. The method includes performing pronunciation learning processing which includes the steps of evaluating user's pronunciation of a plurality of words for each combination of consecutive pronunciation components in the words, and outputting the learning information based on a result of the evaluation.

According to an aspect of the invention, a non-transitory storage medium stores a program which, when executed by at least one processor of an electronic device which includes a memory storing learning information, causes the at least one processor to perform pronunciation learning processing which includes evaluating user's pronunciation of a plurality of words for each combination of consecutive pronunciation components in the words, and outputting the learning information based on a result of the evaluation.

According to an aspect of the invention, a server apparatus includes a memory that stores learning information, and at least one processor. The processor is adapted to perform pronunciation learning processing which includes receiving, from an external device, a plurality of words used in an externally conducted pronunciation test, and evaluation scores on pronunciation for the respective words, summing up the received evaluation scores for each combination of consecutive pronunciation components in the words, and sending the learning information based on a result of the summing up to the external device.

According to an aspect of the invention, a pronunciation learning processing system includes a server apparatus and a terminal device. The system is adapted to perform pronunciation learning processing which includes evaluating user's pronunciation of a plurality of words for each combination of consecutive pronunciation components in the words, and outputting learning information based on a result of the evaluation.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 shows, for some representative English words, the attributes of the pronunciation component corresponding to the respective English word, as defined in a pronunciation attribute management table stored in a certain storage area (12e) of the learning support device (10).

DETAILED DESCRIPTION

Now, the embodiments will be described with reference to the drawings.

First Embodiment

Figure 1:
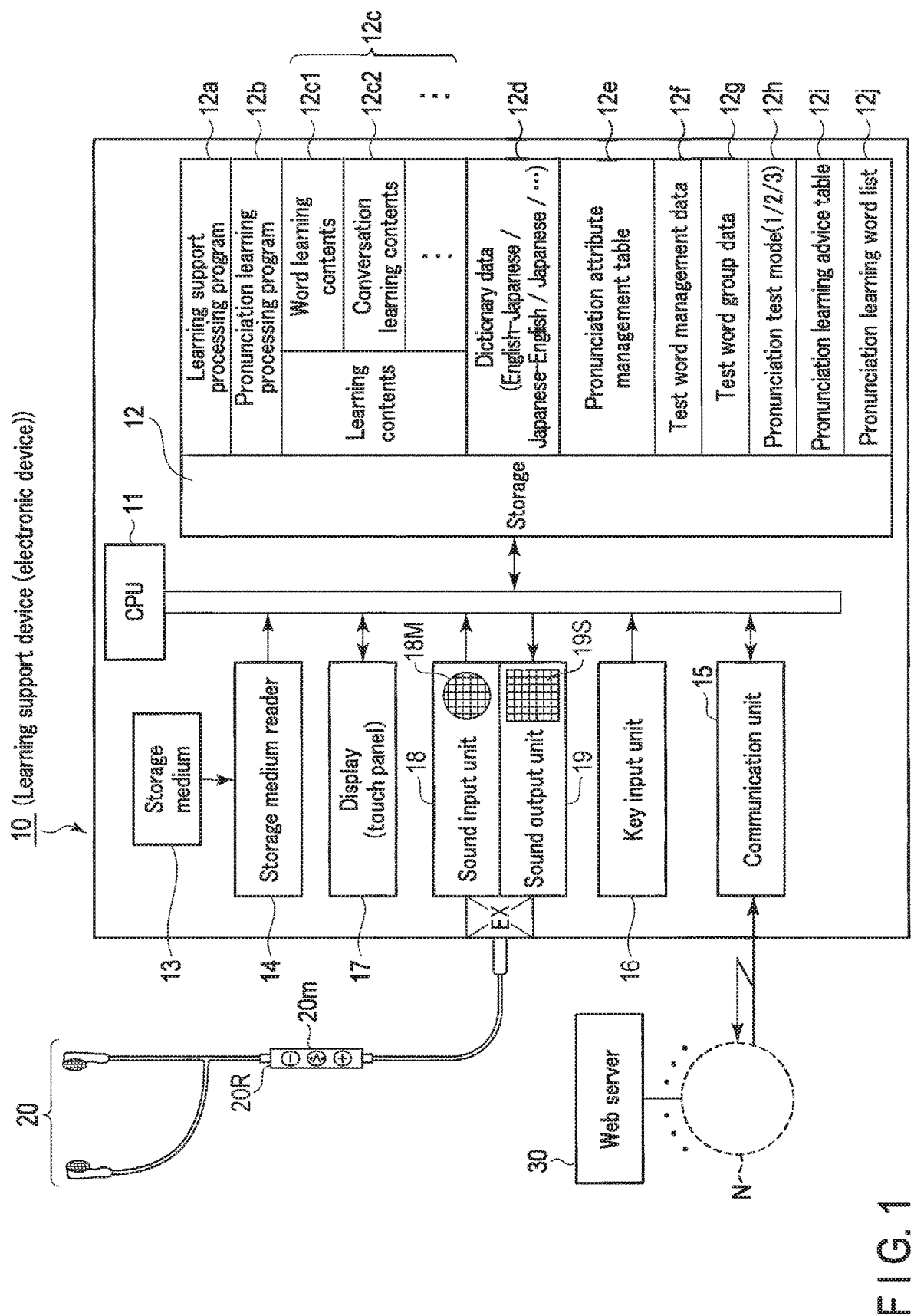
FIG. 1 is a block diagram showing an exemplary electronic circuitry configuration of a learning support device (10) that pertains to an electronic device, a pronunciation learning method, and a program according to a first embodiment of the invention.

FIG. 1 is a block diagram showing an exemplary electronic circuitry configuration of a learning support device 10 which pertains to an electronic device, a pronunciation learning method, and a program according to the first embodiment of the invention.

An electronic device according to the embodiment may be implemented in various forms including the learning support device 10 (typically, an electronic dictionary) as will be described, which may be dedicated for use in supporting learning activities, a tablet-type personal digital assistant (PDA), a personal computer (PC), a cellular phone, an electronic book, a portable game device, and so on.

The learning support device 10 includes electronic circuitry with a CPU (processor) 11 as a computer.

The CPU 11 is adapted to control operations of each circuitry component according to programs including a learning support processing program 12a and a pronunciation learning processing program 12b already stored in a storage 12 (which may be a flash ROM, etc.). These programs may instead, or additionally, be read from an external storage medium 13 (which may be a memory card, etc.) by a storage medium reader 14 and stored in the storage 12, or downloaded from a web server 30 (intended to be a program server here) on a communication network (Internet) N by a communication unit 15 and stored in the storage 12.

The CPU 11 is coupled with the storage 12, the storage medium reader 14, and the communication unit 15, as well as a key input unit (keyboard) 16, a touch panel display 17, a sound input unit 18, a sound output unit 19, etc., via a data/control bus.

The sound input unit 18 includes a microphone 18M adapted to receive sound inputs including voices from a user, etc.

The sound output unit 19 includes a speaker 19S adapted to output sounds including voices formed based on voice data stored or recorded in the storage 12.

The sound input unit 18 and the sound output unit 19 share a terminal EX for external connection, and a user can connect an instrument that includes earphones and a microphone to this terminal EX as needed.

For example, the instrument 20 includes earphones and also a remote control unit 20R with a microphone 20m.

The storage 12 includes various storage areas including a program storage area for storing programs (such as the learning support processing program 12a and the pronunciation learning processing program 12b as mentioned), a learning content storage area 12c, a dictionary data storage area 12d, a pronunciation attribute management table storage area 12e, a test word management data storage area 12f, a test word group data storage area 12g, a pronunciation test mode storage area 12h, a pronunciation learning advice table storage area 12i, and a pronunciation learning word list storage area 12j.

The learning support processing program 12a may be a set of programs including: a system program for controlling the overall operations of the learning support device 10; a program for establishing connections for communication with external electronic devices via the communication unit 15; and a program for performing, in cooperation with the pronunciation learning processing program 12b, learning functions according to data of various contents stored in the learning content storage area 12c and the dictionary data storage area 12d.

The pronunciation learning processing program 12b may be a set of programs to proceed with pronunciation learning processing, including: a program for conducting a pronunciation test for a user by using multiple test words, while categorizing (grouping) the test words based on combinations of pronunciation components which the test words can commonly contain so that the test words having the same combination are categorized in the same group, said combinations each constituted by a first pronunciation component and at least one second pronunciation component immediately succeeding and/or preceding the first pronunciation component; a program for calculating an average score for each test word group based on evaluation scores from the pronunciation test on the respective test words; and a program for outputting advice information for the combination of the first and second pronunciation components corresponding to the subject test word group specified as having, based on the calculated average scores, the average score lower than a predetermined value and lowest among the test word groups, and extracting words that contain the first and second pronunciation components which are the same as those of the subject test word group as pronunciation learning words.

The learning content storage area 12c stores learning content data including, for example, word learning content data 12c1, conversation learning content data 12c2, and so on.

The word learning content data 12c1 includes, for example, text data corresponding to words to be learned which have been collected for each learning level, field of study, etc. (such text data is appended with phonetic symbols), and sound data, semantics or explanatory data, etc., corresponding to the text data. The word learning content data 12c1 may be used according to user operations for the functions of displaying word text data on the display 17, outputting sound data from the sound output unit 19, displaying explanatory data on the display 17, and so on.

The conversation learning content data 12c2 includes, for example, text data corresponding to conversational sentences which have been collected for each scene, etc., and sound data, translation data, etc., corresponding to the text data. The conversation learning content data 12c2 may be used according to user operations for the functions of displaying text data of conversational sentences on the display 17, outputting sound data from the sound output unit 19, performing voice recognition based on the user's voice data input via the sound input unit 18 to display text data for the next conversational sentence, and so on.

The dictionary data storage area 12d stores various types of dictionary content data including, for example, data from English-Japanese dictionaries, Japanese-English dictionaries, English-English dictionaries, Japanese-language dictionaries, and so on. The dictionary content data may be used according to user operations for the functions of, for example, retrieving explanatory data for a search subject word input by key or voice operations from the dictionary content data and outputting the explanatory data through the display and/or in the form of a sound.

Note that the dictionary content data, in each of the various dictionary types, may include words, explanatory data indicative of meanings or the like of the respective words, text data of example phrases or sentences containing the applicable word, sound data corresponding to the text data, and so on. Among these, for example, the text data for the word portions is appended with phonetic symbols.

The pronunciation attribute management table storage area 12e stores, for example, a pronunciation attribute management table which defines the attributes of pronunciation components for all English words contained in the English-related dictionary content data in the dictionary data storage area 12d.

FIG. 2 shows, for some representative English words, the attributes of the pronunciation component corresponding to the respective English word, as defined in the pronunciation attribute management table stored in the pronunciation attribute management table storage area 12e of the learning support device 10.

As shown in FIG. 2, the pronunciation attribute management table (in the area 12e) defines, for each word, a first pronunciation component (symbol) as an evaluation subject in a pronunciation test, attribute data of the first pronunciation component, a second pronunciation component (symbol) consecutive to the first pronunciation component (in the example shown, immediately succeeding the first pronunciation component), and the attribute data of the second pronunciation component.

The pronunciation attribute management table (in the area 12e) retains the words by category (group) so that the words having the same first pronunciation component as the evaluation subject are in the same group.

In the exemplary pronunciation attribute management table shown in FIG. 2, words such as "thank", "thaw", "think", etc., having a common first pronunciation component "θ" (with an attribute "Fricative") are sorted (grouped) to be arranged in the top portion of the table. The word "thank" has a second pronunciation component "æ" (with an attribute "Vowel which does not exist in Japanese"), the word "think" has a second pronunciation component "i" (with an attribute "Vowel [i]"), and the word "thread" has a second pronunciation component "r" (with an attribute "Lateral/retroflex").

Note that the official font for the phonetic symbols might not be properly presented in the description here, so the description may occasionally make use of an English alphabet similar to the intended phonetic symbol as a substitute. The phonetic symbols in the drawings are given in the official font.

The test word management data storage area 12f stores test word data, i.e., the data of words used in a pronunciation test, in the form of corresponding word text data and sound data, or data indicative of the location of the corresponding word in the dictionary data storage area 12d, in the course of the pronunciation learning processing based on the pronunciation learning processing program 12b.

Figure 6:
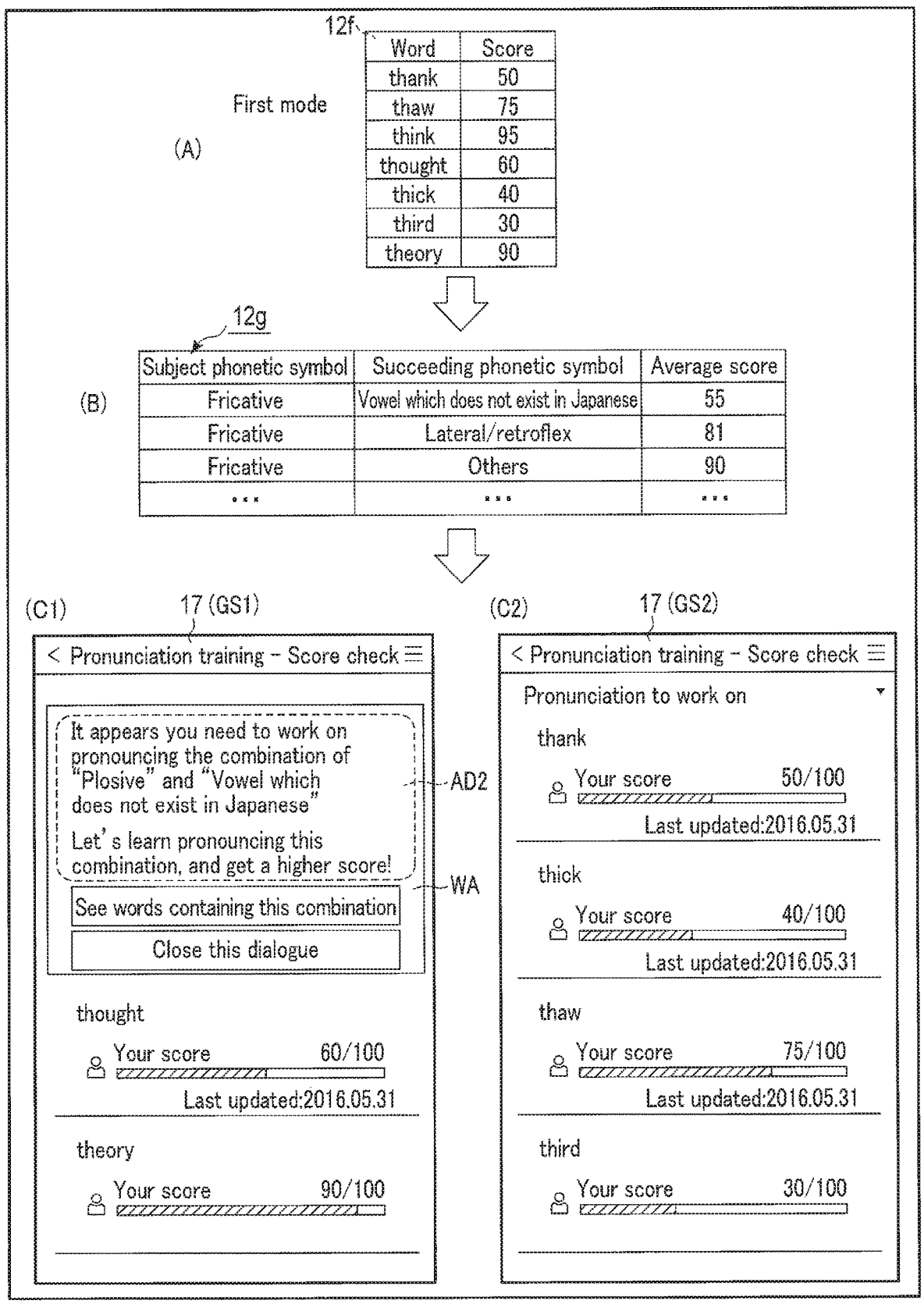
FIG. 6 illustrates how display operations may be performed according to the pronunciation learning processing of the learning support device (10).

The test word group data storage area 12g stores a pronunciation attribute combination table (cf., FIG. 6 (B)) for the test words managed with the test word management data storage area 12f. This pronunciation attribute combination table is used for grouping combinations of the first pronunciation component as the evaluation subject and the second pronunciation component based on the pronunciation attribute management table (in the area 12e), and associating, for each grouped combination, the data indicative of the combination of the attribute of the first pronunciation component and the attribute of the second pronunciation component with the data indicative of an average score.

The pronunciation test mode storage area 12h stores data indicative of the mode of a pronunciation test in the pronunciation learning processing, and this mode may be one of a first mode, a second mode, and a third mode.

The mode of a pronunciation test is the first mode when a user does not designate the first pronunciation component as the evaluation subject in the pronunciation test (that is, when no pronunciation component is specified). The mode is the second mode when a user designates the first pronunciation component but not the second pronunciation mode (that is, when only the first pronunciation component is specified). The mode is the third mode when a user designates the first pronunciation component and the second pronunciation component.

The pronunciation learning advice table storage area 12i stores data of advice notes for pronunciation learning that will be given to a user according to the evaluation scores obtained in the pronunciation test.

Figure 3:
FIG. 3 shows a certain example of advice which a user is given according to an evaluation score stored in a pronunciation learning advice table storage area (12i) of the learning support device (10).

FIG. 3 shows a certain example of the advice notes a user is given according to the evaluation score stored in the pronunciation learning advice table storage area 12i of the learning support device 10.

According to one exemplary implementation, in response to determining that 95% or more evaluation scores (most of the evaluation scores) for the test words used in a pronunciation test are each less than 80 points, and that the scores do not apparently vary depending on the combinations of the first pronunciation component and the second pronunciation component, the user is given advice AD1 that suggests learning the pronunciation of words with the same first pronunciation component as in these test words.

Also according to one exemplary implementation, in response to determining that, among the test words used in a pronunciation test, the group corresponding to the combination of specific first and second pronunciation components shows an average score of less than 80 points, the user is given advice AD2 that suggests learning the pronunciation of words having such a combination of specific first and second pronunciation components.

The pronunciation learning word list storage area 12j stores a word list for pronunciation learning, constituted by data of words extracted from, for example, the data in the English-Japanese dictionaries in the dictionary data storage area 12d as the word data to be learned by the user, tailored based on the average score obtained from the pronunciation test for each group corresponding to the respective combination of the first and second pronunciation components.

The learning support device 10 having the foregoing configurations realizes the pronunciation learning functions as will be described, through software and hardware cooperative actions where the CPU 11 controls operations of each circuitry component according to the instructions described in the learning support processing program 12a and the pronunciation learning processing program 12b.

Next, how the learning support device 10 (electronic dictionary) according to the first embodiment operates will be described.

Figure 4:
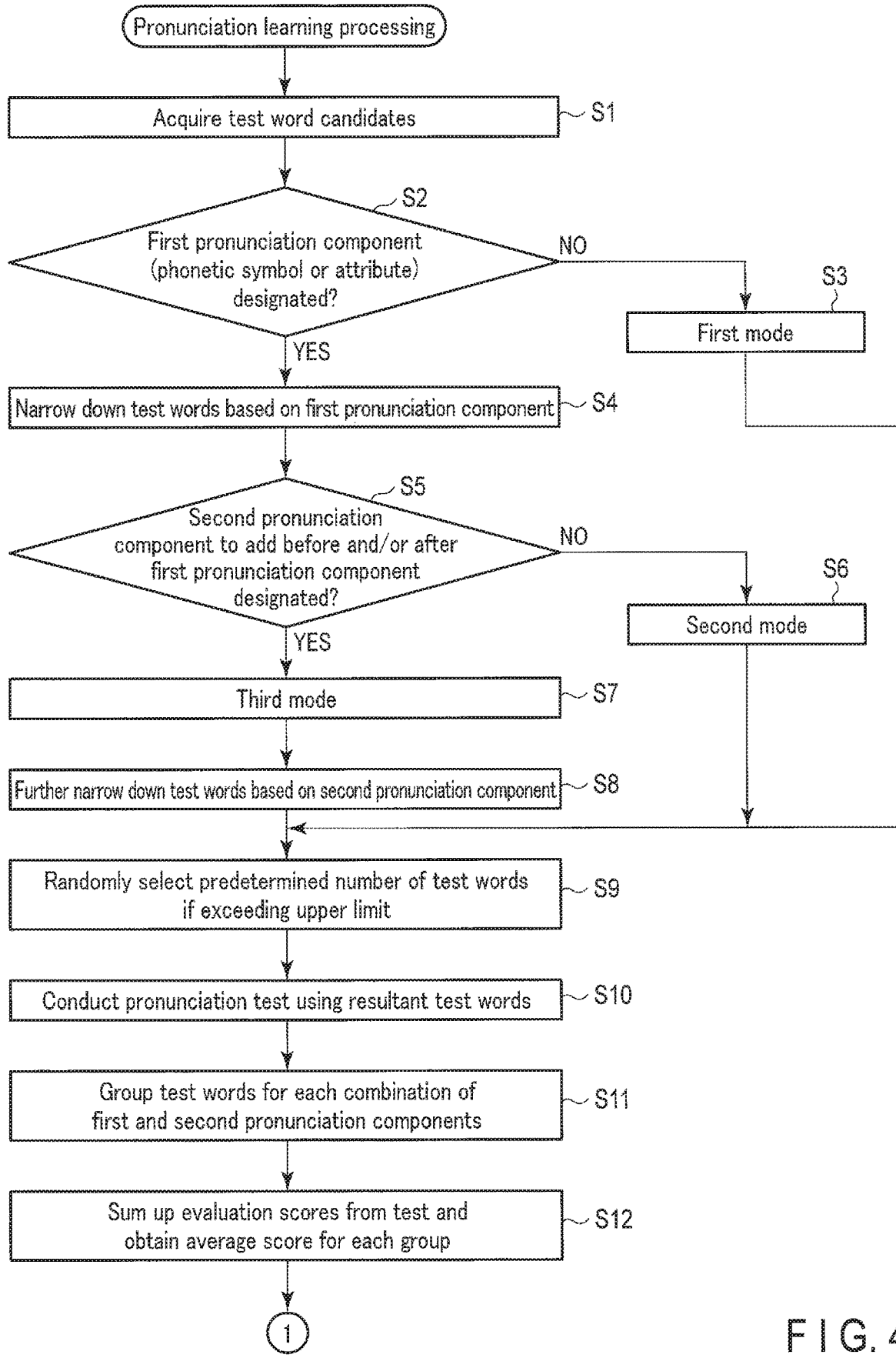
FIG. 4 is a flowchart for explaining pronunciation learning processing (phase 1) of the learning support device (10).

FIG. 4 is a flowchart for explaining the pronunciation learning processing (phase 1) of the learning support device 10.

Figure 5:
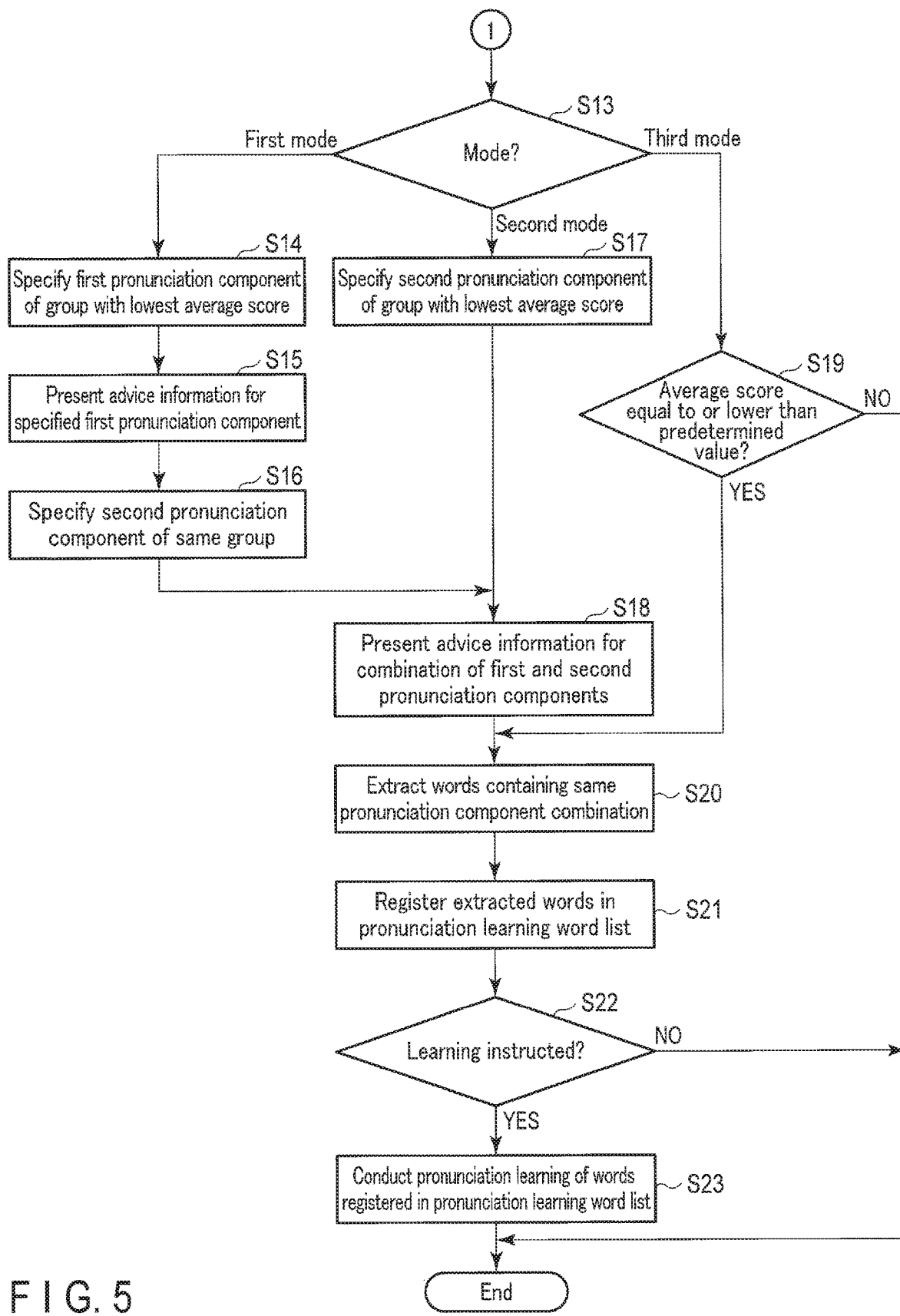
FIG. 5 is a flowchart for explaining pronunciation learning processing (phase 2) of the learning support device (10).

FIG. 5 is a flowchart for explaining the pronunciation learning processing (phase 2) of the learning support device 10.

FIG. 6 illustrates the display operations performed according to the pronunciation learning processing of the learning support device 10.

First, when the learning support device 10 displays a home screen (not illustrated) on the touch panel display 17, and the pronunciation learning processing program 12b is activated in response to an instruction for a "pronunciation test" given by a user operation on the home screen, the CPU 11 acquires, for example, data of each word from the English-Japanese dictionaries in the dictionary data storage area 12d as candidates of the test words, and tentatively holds the acquired data of the test word candidates in the test word management data storage area 12f (step S1).

The CPU 11 here causes the display 17 to display a pronunciation component designation screen (not illustrated) for the user to designate the first pronunciation component and the second pronunciation component, as the evaluation subject in the pronunciation test.

Through the pronunciation component designation screen, the first pronunciation component and the second pronunciation component are separately designated using the respective, corresponding phonetic symbols or attributes.

If the first pronunciation component is not designated through the pronunciation component designation screen, the CPU 11 stores data for the first mode in the pronunciation test mode storage area 12h (step S2: "NO"→step S3).

In response to the first pronunciation component having been designated through the pronunciation component designation screen, the CPU 11 narrows down the test word candidates held in the test word management data storage area 12f to the test word candidates each having the designated first pronunciation component, and stores the resultant data in the test word management data storage area 12f afresh (step S2: "YES"→step S4).

If, after the designation of the first pronunciation component, the second pronunciation component is not designated through the pronunciation component designation screen, the CPU 11 stores data for the second mode in the pronunciation test mode storage area 12h (step S5: "NO"→step S6).

If, after the designation of the first pronunciation component, the second pronunciation component to add to the succeeding position and/or the preceding position of this first pronunciation component is designated, the CPU 11 stores data for the third mode in the pronunciation test mode storage area 12h (step S5: "YES"→step S7).

In response to the second pronunciation component having been designated, the CPU 11 further narrows down the test word candidates having the respective first pronunciation components, stored in the test word management data storage area 12f, to the test word candidates each also having the designated second pronunciation component, and stores the resultant data in the test word management data storage area 12f afresh (step S8).

The subsequent processing steps S9 to S12 are performed in all of the first, second, and third modes.

There may be an instance where the number of test word candidates stored in the test word management data storage area 12f exceeds a predetermined number (for example, 30) as an upper limit which may be set in advance. In such an instance, the CPU 11 randomly selects or collects a predetermined number of test word candidates from the test word candidates stored in the test word management data storage area 12f, and newly stores the selected data in the test word management data storage area 12f (step S9).

The CPU 11 conducts the pronunciation test using the test words stored in the test word management data storage area 12f (step S10).

In one exemplary implementation, the CPU 11 causes the display 17 to sequentially display texts of the respective test words for use in the pronunciation test, and concurrently receives sound data (voice data) for these test words produced by the user and input via the sound input unit 18. The CPU 11 then compares the input sound data to model sound data for evaluation, and determines an evaluation score for each of the test words.

The CPU 11 causes the display 17 to display the evaluation score having been determined for each test word as shown in, for example, FIG. 6 (A).

The CPU 11 refers to the pronunciation attribute management table (in the area 12e, c.f., FIG. 2) to group the test words for each available combination of the first pronunciation component and the second pronunciation component, and writes and stores, for each of such groups, the combination of the attribute of the first pronunciation component and the attribute of the second pronunciation component in the pronunciation attribute combination table (cf., FIG. 6 (B)) in the test word group data storage area 12g (step S11).

Note that, if the pronunciation test has been performed under the first mode (that is, when the test words have been acquired without designation of the first pronunciation component), the grouping in step S11 is performed in the following manner. Namely, a pronunciation component common to the test words is adopted as the first pronunciation component, the test words sharing this first pronunciation component are grouped together (if there is no pronunciation component common to all the test words, i.e., no single first pronunciation component, the grouping may create multiple groups of the test words sharing the respective common pronunciation components, i.e., respective first pronunciation components), and the test word groups obtained based on the first pronunciation component are further grouped for each combination of the first pronunciation component and the second pronunciation component.

Also, if the pronunciation test has been performed under the third mode (that is, when the test words have been acquired with designation of both the first and second pronunciation components), the grouping in step S11 creates one group of the test words for the combination of the first pronunciation component and the second pronunciation component.

The CPU 11, based on the evaluation scores for the respective test words determined in step S10, sums up the evaluation scores for the test words in each group created in step S11 for the combination of the first pronunciation component and the second pronunciation component, and calculates an average score for each group. The CPU 11 then stores the calculated average score for each group in association with the corresponding combination of the first pronunciation component and the second pronunciation component in the pronunciation attribute combination table (cf., FIG. 6 (B)) in the test word group data storage area 12g (step S12).

The CPU 11 here may cause the display 17 to display the pronunciation attribute combination table (from the area 12g), in which each combination of the attribute of the first pronunciation component and the attribute of the second pronunciation component for the respective test word group is written in association with the average score as shown in, for example, FIG. 6 (B).

The CPU 11 determines which of the first, second, and third modes is indicated by the data indicative of the mode of the pronunciation test, stored in the pronunciation test mode storage area 12h (step S13).

[First Mode]

If the mode of the pronunciation test is determined to be the first mode, the CPU 11 specifies the first pronunciation component of the group with the lowest average score among the groups corresponding to the respective combinations of the attributes of the first and second pronunciation components, stored in the pronunciation attribute combination table in the test word group data storage area 12g (step S13: "First mode"→step S14).

The CPU 11 reads data of an advice note that encourages learning the pronunciation of words having the specified first pronunciation component, from the pronunciation learning advice table (cf., FIG. 3) stored in the pronunciation learning advice table storage area 12*i*. (Such a note may read, for example, "It appears you need to work on pronouncing words with 'first pronunciation component [attribute of the first pronunciation component is inserted here]'. Let's learn pronouncing words with this 'first pronunciation component [attribute of the first pronunciation component is inserted here]' over again!") The CPU 11 then presents this advice note via the display 17 as, for example, a pronunciation learning advice window WA on a pronunciation test score check screen GS1, showing the evaluation scores for the respective test words with the use of bar charts, as similarly shown in FIG. 6 (C1) (step S15).

The user can accordingly know that she or he does not have sufficient skill in pronouncing words with the specified first pronunciation component among the test words, and that learning the pronunciation of words having the specified first pronunciation component is important and effective, even under this first mode where the first pronunciation component as the evaluation subject has not been personally designated by the user.

The CPU 11 also specifies the second pronunciation component of the group having the lowest average score, from which the first pronunciation component has been specified in step S14 (step S16).

The CPU 11 reads data of an advice note that encourages learning the pronunciation of words having the combination of the specified first and second pronunciation components, from the pronunciation learning advice table (cf., FIG. 3) stored in the pronunciation learning advice table storage area 12*i*. (Such a note may read, for example, "It appears you need to work on pronouncing the combination of 'first pronunciation component [attribute of the first pronunciation component is inserted here]' and 'second pronunciation component [attribute of the second pronunciation component is inserted here]'. Let's learn pronouncing this combination, and get a higher score!") The CPU 11 then presents this advice note via the display 17 as, for example, another pronunciation learning advice window WA on the pronunciation test score check screen GS1 as shown in FIG. 6 (C1) (step S18).

The user can accordingly know that she or he does not have sufficient skill in pronouncing the combination of the specified first and second pronunciation components among the test words, and that learning the pronunciation of this pronunciation component combination is important and effective, even under the first mode where the first pronunciation component as the evaluation subject has not been personally designated by the user.

The CPU 11 extracts words each containing the combination of the specified first and second pronunciation components from, for example, the English-Japanese dictionary data stored in the dictionary data storage area 12*d* (step S20). The CPU 11 sets the extracted words in a word list for pronunciation learning, and stores this list in the pronunciation learning word list storage area 12*j* (step S21).

[Second Mode]

If it is determined in step S13 that the mode of the pronunciation test is the second mode (step S13: "Second mode"), the CPU 11 specifies the second pronunciation component of the group with the lowest average score among the groups corresponding to the respective combinations of the attributes of the first and second pronunciation components, stored in the pronunciation attribute combination table in the test word group data storage area 12*g* (step S13: "Second mode"→step S17). Here, according to the example shown in FIG. 6 (B), the specified second pronunciation component is "Vowel which does not exist in Japanese", the group with the lowest average score is the group with the average score of 55 points, the attributes of the first pronunciation components in the available combinations are all "Fricative", and the attributes of the second pronunciation components are "Vowel which does not exist in Japanese", "Lateral/retroflex", and "Others".

The CPU 11 reads data of an advice note that encourages learning the pronunciation of words having the combination of the user's designated first pronunciation component (e.g., fricative "θ") and the specified second pronunciation component (e.g., vowel which does not exist in Japanese such as "æ"), from the pronunciation learning advice table (cf., FIG. 3) stored in the pronunciation learning advice table storage area 12*i*. (Such a note may read, for example, "It appears you need to work on pronouncing the combination of 'fricative' and 'vowel which does not exist in Japanese'. Let's learn pronouncing this combination, and get a higher score!") The CPU 11 then presents this advice note via the display 17 as, for example, a pronunciation learning advice window WA on the pronunciation test score check screen GS1 as similarly shown in FIG. 6 (C1) (step S18).

Accordingly, under the second mode where the user has personally designated the first pronunciation component as the evaluation subject, the user can know that she or he does not have sufficient skill in pronouncing, among the test words containing this first pronunciation component, the combination of the first pronunciation component and the second pronunciation component that has been specified based on the result of the pronunciation test, and that learning the pronunciation of this pronunciation component combination is important and effective.

Note that, with the pronunciation learning advice window WA on the pronunciation test score check screen GS1 as shown in FIG. 6 (C1), the CPU 11 may, in response to an operation of touching a button or the like indicating a word check message (e.g., "View words having this combination"), cause the display 17 to display a poorly pronounced word check screen GS2 with bar charts showing the respective evaluation scores for the test words that resulted in a low achievement as, for example, less than 80 points.

The CPU 11 extracts words each containing the combination of the user's designated first pronunciation component and the second pronunciation component specified based on the result of the pronunciation test from, for example, the English-Japanese dictionary data stored in the dictionary data storage area 12*d* (step S20). The CPU 11 sets the extracted words in a word list for pronunciation learning, and stores this list in the pronunciation learning word list storage area 12*j* (step S21).

When the mode of the pronunciation test is the second mode, the CPU 11 in step S17 may determine that the groups with the low average scores, among the groups corresponding to the respective combinations of the first and second pronunciation components, do not apparently vary in their scores. That is, there may be an instance where, for example, all the groups are determined to have an average score of less than 80 points, and even the largest difference between the average scores of these groups is determined to be less than 5 points. In such an instance, the CPU 11 reads the data of an advice note that encourages learning the pronunciation of words having the first pronunciation component designated as the evaluation subject by the user, from the pronunciation learning advice table (cf., FIG. 3) stored in the pronunciation learning advice table storage area 12*i*. (Such a note may read, for example, "It appears you need to work on pronouncing words with 'first pronunciation component

[attribute of the first pronunciation component is inserted here]'. Let's learn pronouncing words with this 'first pronunciation component [attribute of the first pronunciation component is inserted here]' over again!") The CPU 11 then presents this advice note via the display 17 as, for example, the pronunciation learning advice window WA on the pronunciation test score check screen GS1 as similarly shown in FIG. 6 (C1).

Accordingly, under the second mode where the user has designated the first pronunciation component as the evaluation subject, the user can know that she or he does not have sufficient skill in pronouncing words having the designated first pronunciation component irrespective of which second pronunciation component is combined with this first pronunciation component, and that learning the pronunciation of words having the first pronunciation component is important and effective.

For this instance, the CPU 11 in steps S20 and S21 extracts words each containing the user's designated first pronunciation component from, for example, the English-Japanese dictionary data stored in the dictionary data storage area 12d, sets the extracted words in a word list for pronunciation learning, and stores the list in the pronunciation learning word list storage area 12j.

[Third Mode]

If it is determined in step S13 that the mode of the pronunciation test is the third mode (step S13: "Third mode"), the CPU 11 determines whether or not the average score of the group of the test words (single group) for the combination of the first and second pronunciation components, both designated as the evaluation subject by the user herself or himself, is equal to or lower than a predetermined value (e.g., 80 points) (step S19).

If the average score is determined to be equal to or lower than the predetermined value (step S19: "YES"), the CPU 11 extracts words each containing the combination of the user's designated first and second pronunciation components from, for example, the English-Japanese dictionary data stored in the dictionary data storage area 12d (step S20). The CPU 11 sets the extracted words in a word list for pronunciation learning, and stores this list in the pronunciation learning word list storage area 12j (step S21).

When execution of pronunciation learning is instructed by a user operation while the pronunciation learning word list storage area 12j retains the word list for pronunciation learning under one or each of the first mode, the second mode, and the third mode (step S22: "YES"), the CPU 11 performs pronunciation learning processing for the user by employing the words in the word list as words for use in the pronunciation learning (step S23).

In step S23, the pronunciation learning processing is executed using the words in the word list for pronunciation learning. Here, when each of the words in the word list contains the first pronunciation component specified as the user's weak point, a pronunciation test under the second mode may be repeated using such words as the test words, for the pronunciation learning processing according to the embodiment. Also, when each of the words in the word list contains the first and second pronunciation components specified as the user's weak point, a pronunciation test under the third mode may be repeated using such words as the test words, for the pronunciation learning processing according to the embodiment. In this manner, the user can effectively learn and master the pronunciation of pronunciation components at which the user is not proficient.

SUMMARY OF FIRST EMBODIMENT

According to the first embodiment, the learning support device 10 uses the first mode if no first pronunciation component is designated as an evaluation subject in a word pronunciation test, so that words acquired from, for example, prescribed English-Japanese dictionary data are stored in the test word management data storage area 12f as test words. If only a first pronunciation component is designated as the evaluation subject, the learning support device 10 uses the second mode so that words containing the designated first pronunciation component are stored in the test word management data storage area 12f as test words. If a first pronunciation component and at least one second pronunciation component immediately succeeding and/or preceding the first pronunciation component are designated as the evaluation subject, the learning support device 10 uses the third mode so that words containing the combination of the designated first and second pronunciation components are stored in the test word management data storage area 12f as test words.

The learning support device 10 conducts the pronunciation test using the test words, and determines evaluation scores for respective test words while grouping the test words based on the combinations of the consecutive first and second pronunciation components therein, and accordingly sums up the evaluation scores for the test words and calculates an average score for each group.

Under the first mode, the combination of the first and second pronunciation components that corresponds to the group having the lowest average score is specified, and advice information for the specified combination of the first and second pronunciation components is presented to the user. Together, words containing the specified combination of the first and second pronunciation components are extracted from, for example, prescribed English-Japanese dictionary data and stored in a pronunciation learning word list (in area 12j).

Under the second mode, the second pronunciation component corresponding to the group having the lowest average score is specified, and advice information for the combination of the designated first pronunciation component and the specified second pronunciation component is presented to the user. Together, words containing the combination of the designated first pronunciation component and the specified second pronunciation component are extracted from the prescribed English-Japanese dictionary data and stored in the pronunciation learning word list (in area 12j).

Under the third mode, if the group of the test words, which is the single group with the first and second pronunciation components both having been designated, has the average score equal to or lower than a predetermined value, words containing the combination of the designated first and second pronunciation components are extracted from the prescribed English-Japanese dictionary data and stored in the pronunciation learning word list (in area 12j).

Then, upon receipt of an instruction for executing learning, the learning support device 10 performs pronunciation learning processing for the user by using the words stored in the pronunciation learning word list (in area 12j).

Therefore, the first embodiment allows for identifying, among multiple different words that share the same pronunciation component as the first pronunciation component, a pronunciation type (combination of the first pronunciation component and at least one of its preceding and/or succeeding second component) at which the user is not proficient. Not only this, the first embodiment also allows for effective learning of the pronunciation of words containing such a pronunciation type as the user's weak point.

Note that the foregoing description has basically assumed that the learning support device 10 according to the first embodiment uses two consecutive pronunciation components such that the preceding one is the first pronunciation component and the succeeding one is the second pronunciation component. However, the positions of the first and second pronunciation components may be reversed. More specifically, and for example, the user in the second mode may designate the succeeding one of the two consecutive pronunciation components, and the grouping processing for operations of summing up the evaluation scores, etc. may be performed for each available combination of this succeeding pronunciation component and the preceding pronunciation component.

Moreover, the first embodiment is applicable to cases of three or more consecutive pronunciation components as well, where the user may designate any number of pronunciation components at any position, and the grouping processing for operations of summing up the evaluation scores, etc. may be performed for each available combination of such designated pronunciation components and the remaining, undesignated pronunciation components.

According to the configuration of the first embodiment, the series of processing included in the pronunciation learning processing, described with reference to FIGS. 4 to 6, is performed in the learning support device 10. Such a series of processing includes: processing of acquiring test word candidates and selecting test words by narrowing down the candidates (steps S1 to S9); processing of conducting a pronunciation test using the test words (step S10); processing of grouping the test words based on the combinations of first and second pronunciation components, and, for each group, summing up the evaluation scores obtained in the pronunciation test for the respective test words and calculating an average score (steps S11 and S12); processing of outputting advice information for learning the pronunciation of the combination of the first and second pronunciation components based on the average score of each group corresponding to the respective combination of the first and second pronunciation components (steps S13 to S18); processing of extracting words each containing the pronunciation component combination according to the advice information, and registering them in a word list for pronunciation learning (steps S20 and S21); and processing of executing pronunciation learning using the words registered in the word list for pronunciation learning (steps S22 and S23).

Second Embodiment

Figure 7:
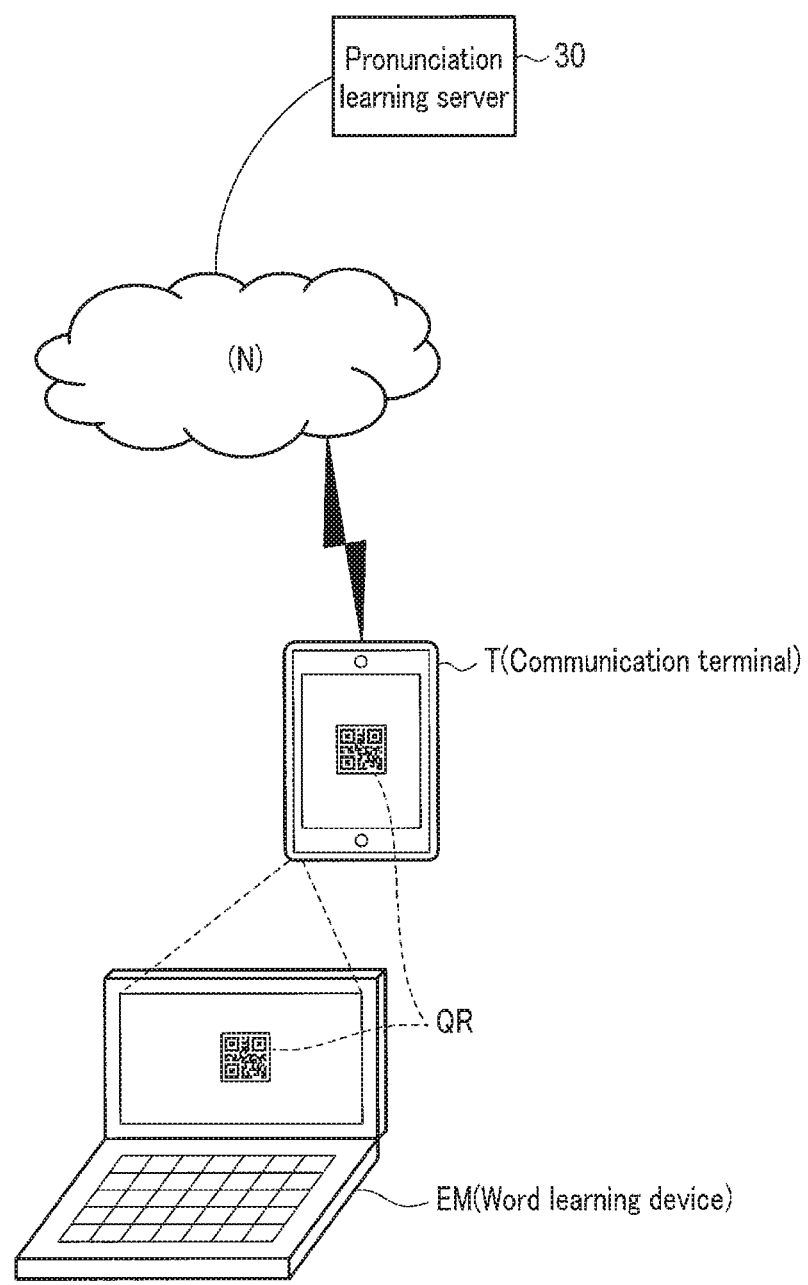
FIG. 7 shows an exemplary configuration of a learning support system according to a second embodiment of the invention.

FIG. 7 shows an exemplary configuration of a learning support system according to the second embodiment of the invention.

The second embodiment adopts a learning support system constituted by a word learning device EM, which may be an electronic dictionary for use by a user, a communication terminal T which may be a tablet terminal used by the same user, and a pronunciation learning server 30 located on a communication network (cloud) N such as the Internet. According to the embodiment, part of the processing, for example, processing step S11 and onward among the series of processing included in the pronunciation learning processing as in the first embodiment, is performed by the pronunciation learning server 30 (instead of the learning support device 10).

With this configuration, the user takes a pronunciation test using the word learning device EM. Subsequently, the user is provided with advice information according to the evaluation result of the pronunciation test, and an opportunity for learning the pronunciation using words for pronunciation learning that accord with the advice information, from the pronunciation learning server 30.

More concretely, the user uses the word learning device EM, such as an electronic dictionary, to take a word pronunciation test corresponding to the processing steps S1 to S10 shown in FIG. 4.

The word learning device EM converts the result of the pronunciation test, i.e., information including test words and also the evaluation scores for the respective test words, into, for example, a two-dimensional code (such as QR Code™) QR and displays it through its display unit.

The user uses the communication terminal T such as a tablet terminal installed with a special application for receiving services from the pronunciation learning server 30, to image the two-dimensional code QR displayed on the word learning device EM.

The communication terminal T operates according to the special application so that it transmits data of the imaged two-dimensional code QR to the pronunciation learning server 30 on the communication network (cloud) N.

The pronunciation learning server 30 decodes the data of the two-dimensional code QR received from the user's communication terminal T, and performs the processing corresponding to steps S11 to S23 shown in FIGS. 4 and 5 based on the test words and the evaluation scores for the respective test words as the result of the user's pronunciation test.

Here, the pronunciation learning server 30 groups the test words used in the pronunciation test for the user based on the combinations of the first pronunciation component and the second pronunciation component, and, for each group, sums up the evaluation scores for the test words obtained from the pronunciation test and calculates an average score.

The pronunciation learning server 30 then generates advice information for learning the pronunciation of the combination of the first and second pronunciation components based on the average score of each group corresponding to the respective combination of the first and second pronunciation components, and sends data of the generated advice information to the user's communication terminal T so that the advice information is presented to the user.

Also based on the average score of each group corresponding to the respective combination of the first and second pronunciation components, the pronunciation learning server 30 further generates a word list for pronunciation learning by extracting words each containing, for example, the combination of the first and second pronunciation components corresponding to the group having the lowest average score, namely, the pronunciation component combination at which the user is not proficient, from a word database which may be stored in the pronunciation learning server 30.

The pronunciation learning server 30 then sends data of the generated word list for pronunciation learning to the user's communication terminal T so that the word list is presented to the user in such a manner that the user is encouraged to learn the pronunciation of the words in the word list.

Therefore, with the learning support system according to the second embodiment, a user takes a pronunciation test using the word learning device EM which she or he uses every day, and images the two-dimensional code QR displayed on the word learning device EM upon finishing the pronunciation test by using the communication terminal T which may be a tablet terminal the user is accustomed to. Only in this way can the user obtain, from the pronunciation learning server 30, advice information according to the evaluation result of the pronunciation test, and a tailored word list for pronunciation learning that corresponds to the advice information.

Moreover, as in the cases of the first embodiment, the second embodiment allows for identifying, among multiple different words that share the same pronunciation component as the first pronunciation component, a pronunciation type (combination of the first pronunciation component and at least one preceding and/or succeeding second component) at which the user is not proficient. Not only this, the second embodiment also allows for effective learning of the pronunciation of words containing such a pronunciation type as the user's weak point.

In each of the foregoing embodiments, processing in the electronic device (learning support device 10) or the learning support system may be implemented by cooperative actions of multiple processors.

Processing intended for implementation through the electronic device (learning support device 10) or the learning support system as described for the foregoing embodiments, namely, the pronunciation learning processing shown in the flowcharts of FIGS. 4 and 5, may be stored and distributed in the form of a computer-executable program in an external storage medium such as a memory card (ROM card, RAM card, etc.), a magnetic disk (Floppy™ disk, hard disk, etc.), an optical disk (CD-ROM, DVD, etc.), or a semiconductor memory. A computer (CPU) in an electronic device may load this program stored in the external storage medium into its own storage unit and control the device operations according to the program, so that the pronunciation learning functions as discussed for each embodiment will be realized and the corresponding processing is performed.

The program data for realizing the processing may also be transmitted on the communication network N in the form of program codes. The program data may be given from a computer device (program server) connected to the communication network N and imported into the storage unit of an individual electronic device, so that the pronunciation learning functions as discussed for each embodiment will be realized and the corresponding processing is performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device that is adapted to function as a combination dictionary and pronunciation learning device, the electronic device comprising:
   a processor; and
   a memory storing a plurality of words in a dictionary data storage area of the memory for use in both dictionary and pronunciation learning functions, and storing dictionary content data associated with the words for use in the dictionary function, the dictionary content data including at least one of explanatory data indicative of word meanings, text data of example phrases or sentences including the words, and sound data corresponding to the text data, the memory further storing first learning information items for use in the pronunciation learning function, the first learning information items stored in association with combinations of pronunciation components, respectively, with the first learning information items each tailored to provide a user first feedback on the associated combination of pronunciation components,
wherein the processor is configured to perform
   designation processing for prompting the user to designate a first pronunciation component from among the pronunciation components,
   selecting processing for selecting, when it is determined that a user designates a first pronunciation component as a designated first pronunciation component and that the user does not designate a second pronunciation component immediately succeeding or preceding the first pronunciation component, a plurality of test words by narrowing down the words stored in the memory to words containing the designated first pronunciation component and storing the selected test words containing the designated first pronunciation component in a test word management data storage area of the memory,
   pronunciation test processing for conducting a pronunciation test for the user using the selected test words stored in the test word management data storage area,
   grouping processing for creating groups of the selected test words where the test words in each group have the designated first pronunciation component but the test words in each group have a different second pronunciation component from the other groups with the second pronunciation component either immediately succeeding or preceding the first pronunciation component and so that the test words in one of the groups all have the same combination of first and second pronunciation components,
   summing-up processing for summing up evaluation scores from the pronunciation test on pronunciation for the respective test words for each group and calculating an average score for each group based on the evaluation scores for the test words of each group,
   specifying processing for automatically specifying, as a specified second pronunciation component, the second pronunciation component in a combination with the first designated pronunciation component in the group having the lowest average score,
   pronunciation learning processing for outputting, as learning information for the user, one of the first learning information items associated with the combination of the designated first pronunciation component and the automatically specified second pronunciation component,
   extracting processing for extracting a list or words having the designated first pronunciation component and the automatically specified second pronunciation component from the dictionary data storage area, and
   storing processing for storing the extracted list of words in a word list storage area of the memory for pronunciation learning by the user,
wherein the processor is configured, if execution of pronunciation learning is instructed according to a user operation while the word list storage area retains the list of words for pronunciation learning, to employ each word in the list of words as a word for use in the pronunciation learning and to perform the pronunciation learning processing for the user.

2. The electronic device according to claim 1, wherein the processor is configured to output a word containing the specified combination as a word for use in pronunciation learning.

3. The electronic device according to claim 1, wherein the processor is configured so that, if a number of the test words obtained from the acquired candidates is more than a predetermined upper limit, the processor randomly selects a predetermined number of the test words to conduct the pronunciation test.

4. A pronunciation learning method performed by a processor of an electronic device that is adapted to function as a combination dictionary and pronunciation learning device and which comprises a memory storing a plurality of words in a dictionary data storage area of the memory for use in both dictionary and pronunciation learning functions, and storing dictionary content data associated with the words for use in the dictionary function, the dictionary content data including at least one of explanatory data indicative of word meanings, text data of example phrases or sentences including the words, and sound data corresponding to the text data, the memory further storing first learning information items for use in the pronunciation learning function, the first learning information items stored in association with combinations of pronunciation components, respectively, with the first learning information items each tailored to provide a user first feedback on the associated combination of pronunciation components, the pronunciation learning method comprising:

designation processing for prompting the user to designate a first pronunciation component from among the pronunciation components, selecting processing for selecting, when it is determined that a user designates a first pronunciation component as a designated first pronunciation component and that the user does not designate a second pronunciation component immediately succeeding or preceding the first pronunciation component, a plurality of test words by narrowing down the words stored in the memory to words containing the designated first pronunciation component and storing the selected test words containing the designated first pronunciation component in a test word management data storage area of the memory, pronunciation test processing for conducting a pronunciation test for the user using the selected test words stored in the test word management data storage area, grouping processing for creating groups of the selected test words where the test words in each group have the designated first pronunciation component but the test words in each group have a different second pronunciation component from the other groups with the second pronunciation component either immediately succeeding or preceding the first pronunciation component and so that the test words in one of the groups all have the same combination of first and second pronunciation components, summing-up processing for summing up evaluation scores from the pronunciation test on pronunciation for the respective test words for each group and calculating an average score for each group based on the evaluation scores for the test words of each group, specifying processing for automatically specifying as a specified second pronunciation component, the second pronunciation component in a combination with the first designated pronunciation component in the group having the lowest average score, and pronunciation learning processing for outputting, as learning information for the user, the first learning information item stored in the memory in association with the automatically specified combination of the first and second pronunciation components obtained by the specifying processing, extracting processing for extracting a list of words having the designated first pronunciation component and the automatically specified second pronunciation component from the dictionary data storage area, and storing processing for storing the extracted list of words in a word list storage area of the memory for pronunciation learning by the user, wherein the processor is configured, if execution of pronunciation learning is instructed according to a user operation while the word list storage area retains the list of words for pronunciation learning, to employ each word in the list of words as a word for use in the pronunciation learning and to perform the pronunciation learning processing for the user.

5. A non-transitory storage medium storing a program which, when executed by a processor of an electronic device that is adapted to function as a combination dictionary and pronunciation learning device and which comprises a memory storing a plurality of words in a dictionary data storage area of the memory for use in both dictionary and pronunciation learning functions, and storing dictionary content data associated with the words for use in the dictionary function, the dictionary content data including at least one of explanatory data indicative of word meanings, text data of example phrases or sentences including the words, and sound data corresponding to the text data, the memory further storing first learning information items for use in the pronunciation learning function, the first learning information items stored in association with combinations of pronunciation components, respectively, with the first learning information items each tailored to provide a user first feedback on the associated combination of pronunciation components, causes the processor to perform:

designation processing for prompting the user to designate a first pronunciation component from among the pronunciation components, selecting processing for selecting, when it is determined that a user designates a first pronunciation component as a designated first pronunciation component and that the user does not designate a second pronunciation component immediately succeeding or preceding the first pronunciation component, a plurality of test words by narrowing down the words stored in the memory to words containing the designated first pronunciation component and storing the selected test words containing the designated first pronunciation component in a test word management data storage area of the memory, pronunciation test processing for conducting a pronunciation test for the user using the selected test words stored in the test word management data storage area, grouping processing for creating groups of the selected test words where the test words in each group have the designated first pronunciation component but the test words in each group have a different second pronunciation component from the other groups with the second pronunciation component either immediately succeeding or preceding the first pronunciation component and so that the test words in one of the groups all have the same combination of first and second pronunciation components, summing-up processing for summing up evaluation scores from the pronunciation test on pronunciation for the respective test words for each group and calculating an average score for each group based on the evaluation scores for the test words of each group, specifying processing for automatically specifying, as a specified second pronunciation component, the second pronunciation component in a combination with the first designated pronunciation component in the group having the lowest average score, pronunciation learning processing for outputting, as learning information for the user, the first learning information item stored in the memory in association with the automatically specified combination of the first and second pronunciation components obtained by the specifying processing, extracting processing for extracting a list of words having the designated first pronunciation component and the automatically specified second pronunciation component from the dictionary data storage area, and storing processing for storing the extracted list of words in a word list storage area of the memory for pronunciation learning by the user, wherein the processor is configured, if execution of pronunciation learning is instructed according to a user operation while the word list storage area retains the list of words for pronunciation learning, to employ each word in the list of words as a word for use in the pronunciation learning and to perform the pronunciation learning processing for the user.

6. A server apparatus comprising:

a processor; and a memory storing a plurality of words in a dictionary data storage area of the memory for use in both dictionary and pronunciation learning functions, and storing dictionary content data associated with the words for use in the dictionary function, the dictionary content data including at least one of explanatory data indicative of word meanings, text data of example phrases or sentences including the words, and sound data corresponding to the text data, the memory further storing first learning information items for use in the pronunciation learning function, the first learning information items stored in association with combinations of pronunciation components, respectively, with the first learning information items each tailored to provide a user first feedback on the associated combination of pronunciation components, wherein the processor is configured to perform designation processing for prompting the user to designate a first pronunciation component from among the pronunciation components, selecting processing for selecting, when it is determined that a user designates a first pronunciation component as a designated first pronunciation component and that the user does not designate a second pronunciation component immediately succeeding or preceding the first pronunciation component, a plurality of test words by narrowing down the words stored in the memory to words containing the designated first pronunciation component and storing the selected test words containing the designated first pronunciation component in a test word management data storage area of the memory, pronunciation test processing for conducting a pronunciation test for the user using the selected test words stored in the test word management data storage area, grouping processing for creating groups of the selected test words where the test words in each group have the designated first pronunciation component but the test words in each group have a different second pronunciation component from the other groups with the second pronunciation component either immediately succeeding or preceding the first pronunciation component and so that the test words in one of the groups all have the same combination of first and second pronunciation components, summing-up processing for summing up evaluation scores from the pronunciation test on pronunciation for the respective test words from the pronunciation test for each group and calculating an average score for each group based on the evaluation scores for the test words of each group, specifying processing for automatically specifying as a specified second pronunciation component, the second pronunciation component in a combination with the first designated pronunciation component in the group having the lowest average score, pronunciation learning processing for outputting, as learning information for the user, the first learning information item stored in the memory in association with the automatically specified combination of the first and second pronunciation components obtained by the specifying processing, extracting processing for extracting a list of words having the designated first pronunciation component and the automatically specified second pronunciation component from the dictionary data storage area, and storing processing for storing the extracted list of words in a word list storage area of the memory for pronunciation learning by the user, wherein the processor is configured, if execution of pronunciation learning is instructed according to a user operation while the word list storage area retains the list of words for pronunciation learning, to employ each word in the list of words as a word for use in the pronunciation learning and to perform the pronunciation learning processing for the user.

7. A pronunciation learning processing system including server apparatus and a terminal device, the system comprising:

a processor; and a memory storing a plurality of words in a dictionary data storage area of the memory for use in both dictionary and pronunciation learning functions, and storing dictionary content data associated with the words for use in the dictionary function, the dictionary content data including at least one of explanatory data indicative of word meanings, text data of example phrases or sentences including the words, and sound data corresponding to the text data, the memory further storing first learning information items for use in the pronunciation learning function, the first learning information items stored in association with combinations of pronunciation components, respectively, with the first learning information items each tailored to provide a user first feedback on the associated combination of pronunciation components, wherein the processor is configured to perform designation processing for prompting the user to designate a first pronunciation component from among the pronunciation components, selecting processing for selecting, when it is determined that a user designates a first pronunciation component as a designated first pronunciation component and that the user does not designate a second pronunciation component immediately succeeding or preceding the first pronunciation component, a plurality of test words by narrowing down the words stored in the memory to words containing the designated first pronunciation component and storing the selected test words containing the designated first pronunciation component in a test word management data storage area of the memory, pronunciation test processing for conducting a pronunciation test for the user using the selected test words stored in the test word management data storage area, grouping processing for creating groups of the selected test words where the test words in each group have the designated first pronunciation component but the test words in each group have a different second pronunciation component from the other groups with the second pronunciation component either immediately succeeding or preceding the first pronunciation component and so that the test words in one of the groups all have the same combination of first and second pronunciation components, summing-up processing for summing up evaluation scores from the pronunciation test on pronunciation for the respective test words for each group and calculating an average score for each group based on the evaluation scores for the test words of each group, specifying processing for automatically specifying as a specified second pronunciation component, the second pronunciation component in a combination with the first designated pronunciation component in the group having the lowest average score, pronunciation learning processing for outputting, as learning information for the user, the first learning information item stored in the memory in association with the automatically specified combination of the first and second pronunciation components obtained by the specifying processing, extracting processing for extracting a list of words having the designated first pronunciation component and the automatically specified second pronunciation component from the dictionary data storage area, and storing processing for storing the extracted list of words in a word list storage area of the memory for pronunciation learning by the user, wherein the processor is configured, if execution of pronunciation learning is instructed according to a user operation while the word list storage area retains the list of words for pronunciation learning, to employ each word in the list of words as a word for use in the pronunciation learning and to perform the pronunciation learning processing for the user.

* * * * *

UNITED STATES PATENT AND TRADEMARK OFFICE
CERTIFICATE OF CORRECTION

PATENT NO. : 11,935,425 B2
APPLICATION NO. : 17/008053
DATED : March 19, 2024
INVENTOR(S) : Manato Ono Page 1 of 1

It is certified that error appears in the above-identified patent and that said Letters Patent is hereby corrected as shown below:

In the Claims

In Column 20, Claim 6, Lines 18-19, delete "from the pronunciation test for each" and insert -- for each --, therefor.

Signed and Sealed this
Twenty-second Day of October, 2024

Katherine Kelly Vidal
*Director of the United States Patent and Trademark Office*